A. WEDGE.
VEHICLE ATTACHMENT.
APPLICATION FILED APR. 13, 1911.

1,088,495.

Patented Feb. 24, 1914.

Inventor
Elbert Wedge

Witnesses
A. W. Gardes.
R. A. Hoster

By Victor J. Evans
Attorney

UNITED STATES PATENT OFFICE.

ALBERT WEDGE, OF IRON RIVER, MICHIGAN.

VEHICLE ATTACHMENT.

1,088,495.  Specification of Letters Patent.  Patented Feb. 24, 1914.

Application filed April 13, 1911. Serial No. 620,824.

*To all whom it may concern:*

Be it known that I, ALBERT WEDGE, a citizen of the United States, residing at Iron River, in the county of Iron and State of Michigan, have invented new and useful Improvements in Vehicle Attachments, of which the following is a specification.

The invention relates to vehicles and has for an object to provide an attachment therefor, particularly adaptable for use on children's cutters and sleighs to convert the same from a runner vehicle to a wheeled vehicle.

To accomplish the desired result, use is made of a frame for attachment to the under side of the cutter or sleigh, a plurality of pairs of wheels independently mounted to swing on the mentioned frame and adapted to depend below the level of the cutters so that the runners of the sled will be raised from the ground and means for operating the mentioned wheels to fold beneath the body of the cutter when it is desired to make use of the runners of the same.

Reference is to be had to the accompanying drawings constituting a part of this specification, in which similar characters of reference denote corresponding parts in all the views, and in which—

Figure 1:
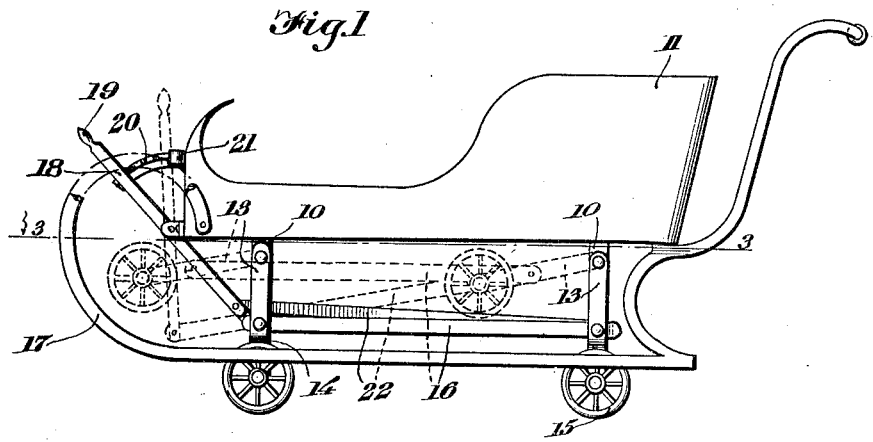
Figure 3:
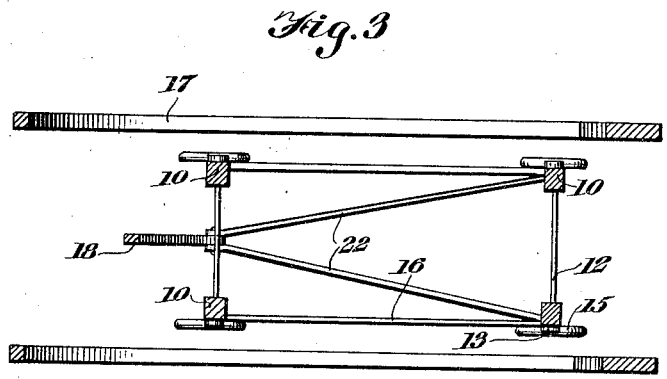
Figure 2:
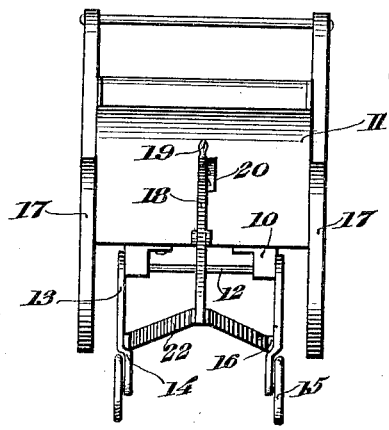

Figure 1 is a side elevation of my device, the same being shown with the wheels in depending or operative position, the dotted lines showing the folded position of the wheels and parts being broken away to disclose the underlying structure. Fig. 2 is a front elevation, parts being broken away, and Fig. 3 is a horizontal sectional view on the line 3—3 in Fig. 1, looking in the direction of the arrow.

Referring more particularly to the views I provide a plurality of spaced bearings 10 for attachment to the under side of a cutter 11, the said bearings, together with suitable brace rods constituting a frame 12. Pivotally mounted to depend from the bearings 10 are wheel rods 13 having their lower ends 14 offset and constituting bearings on which are mounted wheels 15 as shown in Figs. 2 and 3, the mentioned wheels being conveniently disposed in pairs, one pair being positioned at the front end of the cutter and the other pair at the rear end of the cutter. Connecting rods 16 are provided for connecting the relative wheels on the same side of the cutter, the said connecting rods having their ends pivotally connected to the rods 13. Mounted at the front end of the cutter body and between the runners 17 thereof is a lever 18 provided with a handle 19 and secured to the front of the cutter body adjacent the said lever is a notched bar 20 adapted to be engaged by the lever 18 to releasably lock the lever as will be readily understood. Secured over the bar 20 is a catch 21 for engagement with the handle 19 to retain the handle in the desired position as will be hereinafter more fully disclosed. Pivotally connected to the lower end of the lever 18 are a plurality of operating rods 22 having their outer ends pivotally connected to the rods 13 mounted at the rear end of the cutter.

In the operation of my device when the wheels are in depending position and are adapted to constitute the means for permitting the convenient operation of the cutter over the ground the runners 17 will be spaced from the ground as shown in Fig. 1. When it is desired to use the runners 17 as the basic operating medium, the handle 19 of the lever 18 is grasped and by pulling thereon the rods 13, together with the wheels 15 will be moved to folding position relatively to the cutter body and as shown in dotted lines in Fig. 1. Thus it will be seen that when the wheels 15 are moved to folding position, the runners 17 will contact with the ground or snow and will constitute the running gear of the vehicle. The catch 21 is provided to engage the handle 19 and releasably retain the same in locked position when the wheels are folded and by providing the notched bar 20 an additional locking means is provided for the handle 19 as will be also readily understood.

Having thus fully described the invention, what I claim as new, is—

In a device of the class described including a vehicle body provided with runners, of pairs of wheel rods having one end thereof pivotally connected to the underside of the vehicle body adjacent the forward and rearward ends thereof, the free terminal ends of said rods being offset inwardly toward one another to revolubly receive wheels, oppositely disposed connecting rods having the ends thereof connected to said wheel rods and extending longitudinally of and beneath said vehicle body, a pair of operating rods connected to the rear pair of wheel rods at a point between the rear ends of said connecting rods and extending forwardly and gradually converging throughout their entire length and terminating at a point above the offset ends of the wheel rods, means pivotally mounted on the forward terminals of said operating rods and to the forward portion of the vehicle for moving the said wheels into supporting or non-supporting position, and means disposed upon the front of the vehicle and in superposed relation with the pivotal connection of the means with the vehicle, for locking said means to retain the wheels in non-supporting position.

In testimony whereof I affix my signature in presence of two witnesses.

ALBERT WEDGE.

Witnesses:
 JOHN AKERMAN,
 JAS. HOACH.

---

Copies of this patent may be obtained for five cents each, by addressing the "Commissioner of Patents, Washington, D. C."